US012715195B2

(12) United States Patent
Balemans et al.

(10) Patent No.: US 12,715,195 B2
(45) Date of Patent: Aug. 25, 2026

(54) MULTILAYER FILM HAVING EXCELLENT RECOVERABILITY

(71) Applicant: KURARAY CO., LTD., Okayama (JP)

(72) Inventors: Frank Balemans, Melsele (BE); Hiroyuki Shimo, Melsele (BE); Masahiro Kitamura, Melsele (BE); Yuji Shimizu, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 259 days.

(21) Appl. No.: 17/919,308

(22) PCT Filed: Apr. 14, 2021

(86) PCT No.: PCT/JP2021/015438
§ 371 (c)(1),
(2) Date: Oct. 17, 2022

(87) PCT Pub. No.: WO2021/210606
PCT Pub. Date: Oct. 21, 2021

(65) Prior Publication Data

US 2023/0150235 A1 May 18, 2023

(30) Foreign Application Priority Data

Apr. 15, 2020 (JP) ................................ 2020-072915

(51) Int. Cl.

| | |
|---|---|
| ***B32B 7/02*** | (2019.01) |
| ***B29C 48/00*** | (2019.01) |
| ***B29C 48/10*** | (2019.01) |
| ***B29C 48/21*** | (2019.01) |
| ***B29C 55/02*** | (2006.01) |
| ***B29C 55/04*** | (2006.01) |
| ***B29C 55/06*** | (2006.01) |
| ***B29C 55/28*** | (2006.01) |
| ***B29K 23/00*** | (2006.01) |
| ***B29L 31/00*** | (2006.01) |
| ***B32B 1/08*** | (2006.01) |
| ***B32B 7/12*** | (2006.01) |
| ***B32B 27/08*** | (2006.01) |
| ***B32B 27/30*** | (2006.01) |
| ***B32B 27/32*** | (2006.01) |
| ***B65D 65/40*** | (2006.01) |

(52) U.S. Cl.
CPC ............ *B32B 7/02* (2013.01); *B29C 48/0018* (2019.02); *B29C 48/0019* (2019.02); *B29C 48/0022* (2019.02); *B29C 48/022* (2019.02); *B29C 48/10* (2019.02); *B29C 48/21* (2019.02); *B32B 1/08* (2013.01); *B32B 7/12* (2013.01); *B32B 27/08* (2013.01); *B32B 27/306* (2013.01); *B32B 27/32* (2013.01); *B65D 65/40* (2013.01); *B29K 2023/06* (2013.01); *B29K 2023/086* (2013.01); *B29K 2995/0067* (2013.01); *B29L 2031/712* (2013.01); *B32B 2250/24* (2013.01); *B32B 2255/10* (2013.01); *B32B 2255/205* (2013.01); *B32B 2307/516* (2013.01); *B32B 2307/732* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 6,372,359 | B1 * | 4/2002 | Hayashi | C08L 23/08 428/518 |
| 6,383,583 | B1 | 5/2002 | Ninomiya et al. | |
| 10,077,358 | B2 * | 9/2018 | Okamoto | C08J 5/18 |
| 2015/0152256 | A1 | 6/2015 | Nakazawa et al. | |
| 2017/0183426 | A1 | 6/2017 | Kawai et al. | |
| 2020/0391489 | A1 | 12/2020 | Lamtigui et al. | |

FOREIGN PATENT DOCUMENTS

| | | | | |
|---|---|---|---|---|
| CA | 2661994 | A1 * | 3/2008 | B32B 1/02 |
| JP | S55-86717 | A | 6/1980 | |
| JP | H05-08293 | A | 1/1993 | |
| JP | 2000-167998 | A | 6/2000 | |
| JP | 2010-274595 | A | 12/2010 | |
| JP | 2016-29156 | A | 3/2016 | |
| WO | WO 2013/041469 | A1 * | 3/2013 | B32B 27/10 |
| WO | 2013/187455 | A1 | 12/2013 | |
| WO | 2019/243456 | A1 | 12/2019 | |

OTHER PUBLICATIONS

International Search Report issued in corresponding International Patent Application No. PCT/JP2021/015438 dated Jul. 13, 2021.

* cited by examiner

*Primary Examiner* — Frank J Vineis
*Assistant Examiner* — Nicole T Gugliotta
(74) *Attorney, Agent, or Firm* — Morgan, Lewis & Bockius LLP

(57) ABSTRACT

The present disclosure provides a multilayer film comprising a resin composition layer containing an ethylene-vinyl alcohol copolymer with an ethylene unit content of 20 mol % or more and 60 mol % or less and an ethylene-vinyl alcohol copolymer with an ethylene unit content being more than the ethylene-vinyl alcohol copolymer, and a thermoplastic resin layer.

19 Claims, No Drawings

MULTILAYER FILM HAVING EXCELLENT RECOVERABILITY

TECHNICAL FIELD

The present invention relates to a multilayer film, wherein the outermost layer is a resin composition layer containing an ethylene-vinyl alcohol copolymer, and which is stretched at least uniaxially; a method for producing the multilayer film; a vapor deposition multilayer film comprising the multilayer film; a multilayer structure comprising the multilayer film or the vapor deposition multilayer film; and a packaging material comprising the multilayer structure.

BACKGROUND ART

An ethylene-vinyl alcohol copolymer (hereinafter, sometimes abbreviated as "EVOH") is excellent in transparency, gas barrier properties, aroma retention property, solvent resistance, oil resistance and the like, and, taking advantage of these properties, has been used in a wide variety of applications including various packaging such as food packaging, pharmaceutical packaging, industrial chemical packaging, agrochemical packaging; industrial films; agricultural films; floor heating pipes; fuel containers and the like.

In recent years, environmental issues and waste problems have triggered a worldwide demand for so-called post-consumer recycling (hereinafter, sometimes simply abbreviated as "recycling"), in which packaging materials consumed in the market are collected and recycled, and packaging materials with excellent recyclability are desired. For example, there have been made attempts to produce packaging films based solely on polyethylene or polypropylene, which has lower gas barrier properties, and films for gas barrier packaging materials with excellent recyclability, which are produced by mixing or laminated with low amounts of gas barrier materials that are acceptable to be mixed with polyethylene or polypropylene.

Patent Reference No. 1 has described that an EVOH layer with a specific thickness is formed on the outermost layer of the laminate, which, when used as a packaging film, allows heat seal speed to increase without compromising recyclability. It has also described that the laminates can be uniaxially stretched to improve transparency and gas barrier properties.

PRIOR ART REFERENCES

Patent References

Patent Reference No. 1: WO2019/243456

SUMMARY OF THE INVENTION

Problems to be Solved by the Invention

In making a laminate having an EVOH layer on the outermost layer as described in Patent Reference No. 1 by inflation molding, sometimes a cylindrical laminate having an EVOH layer on the outermost layer in the inner surface side is made, and then folded such that the inner surfaces (EVOH layers) are in contact with each other. However, in this case, the EVOH layers disposed on the outermost layer in the inner surface overlap and are stretched together, so that the EVOH layers cause blocking (adhesion). In producing the laminate as described in Patent Reference No. 1 by inflation molding, when the EVOH layer is the outermost layer in the outer side, an EVOH tends to deposit to the outer side of a discharge port (die lip) for a molten resin, so that die lip deposition (deposition on the outer side of a die lip; components of the deposition include residual polymerization catalyst, low molecular weight polymers, thermally decomposed degraded resin components, and low molecular weight components such as an antioxidant, a UV absorber, an antistatic agent, a lubricant and a stabilizer, which may be present in a resin composition) tends to significantly generate, and further, a flow path to the discharge port in the die becomes longer than the outermost layer in the inner side, so that a heat-melting time becomes longer, leading to tendency to easy occurrence of thermal degradation of the EVOH. Therefore, when a laminate with an EVOH layer on the outermost layer is made by inflation molding, it is preferable that the EVOH layer is the outermost layer in the inner side.

To solve the above problems, an objective of the present invention is to provide a multilayer film comprising an EVOH-containing layer as the outermost layer, which maintains excellent gas barrier properties while suppressing blocking of the EVOH-containing layers each other even during stretching after inflation molding; a method for producing the multilayer film; a vapor deposition multilayer film made of the multilayer film; a multilayer structure made of the multilayer film or the vapor deposition multilayer film; and a packaging material having the multilayer structure.

Means for Solving the Problems

According to the present invention, the above objective can be achieved by providing the followings.

[1] A multilayer film comprising a resin composition (A) layer (hereinafter, sometimes abbreviated as "resin composition (A) layer") containing an ethylene-vinyl alcohol copolymer (a1) (hereinafter, sometimes abbreviated as "EVOH (a1)") with an ethylene unit content of 20 mol % or more and 60 mol % or less and an ethylene-vinyl alcohol copolymer (a2) (hereinafter, sometimes abbreviated as "EVOH (a2)") with an ethylene unit content being more than that of EVOH (a1), and a thermoplastic resin (B) layer, wherein the resin composition (A) layer is the outermost layer; and the multilayer film is stretched at least uniaxially by 3 times or more and 12 times or less.

[2] The multilayer film according to [1], further comprising an adhesive resin (C) layer.

[3] The multilayer film according to [2], wherein the thermoplastic resin (B) layer is laminated on the resin composition (A) layer via the adhesive resin (C) layer.

[4] The multilayer film according to any one of [1] to [3], wherein the multilayer film is an inflation molded article.

[5] The multilayer film according to any one of [1] to [4], wherein a mass ratio [a1/a2] of a content of EVOH (a1) to a content of EVOH (a2) in the resin composition (A) layer is 2/98 or more and 98/2 or less.

[6] The multilayer film according to any one of [1] to [5], wherein a difference (a2-a1) in an ethylene unit content between EVOH (a2) and EVOH (a1) in the resin composition (A) layer is 3 mol % or more.

[7] The multilayer film according to any one of [1] to [6], wherein an ethylene unit content of EVOH (a1) is less than 40 mol % and an ethylene unit content of EVOH (a2) is 40 mol % or more.

[8] The multilayer film according to any one of [1] to [7], wherein at least one of EVOH (a1) and EVOH (a2) has a melt flow rate of 5 to 30 g/10 min measured at 210° C. under a load of 2160 g in accordance with JIS K 7210:2014.

[9] The multilayer film according to any one of [1] to [8], wherein a thickness of the resin composition (A) layer is 0.5 to 20 μm, and a ratio of a thickness of the resin composition (A) layer to the total thickness of all layers of the multilayer film is 30% or less.

[10] The multilayer film according to any one of [1] to [9], wherein the thermoplastic resin (B) layer contains a polyethylene resin as a main component.

[11] A vapor deposition multilayer film, wherein an inorganic vapor deposition (D) layer (hereinafter, sometimes abbreviated as "inorganic vapor deposition (D) layer") is adjacent to the exposed surface of the resin composition (A) layer in the multilayer film according to any one of [1] to [10].

[12] A multilayer structure comprising the vapor deposition multilayer film according to [11], further comprising a thermoplastic resin (E) layer.

[13] A multilayer structure comprising the multilayer film according to any one of [1] to [10], further comprising a thermoplastic resin (E) layer.

[14] The multilayer structure according to [12] or [13], wherein both thermoplastic resin (B) layer and thermoplastic resin (E) layer contain a polyethylene resin as a main component.

[15] A packaging material comprising the multilayer structure according to any one of [12] to [14].

[16] A method for producing the multilayer film according to any one of [1] to [10], comprising Step (I): forming a cylindrical multilayer film comprising the resin composition (A) layer and the thermoplastic resin (B) layer, wherein the outermost layer of the inner side is the resin composition (A) layer, by inflation molding;

Step (II): folding the cylindrical multilayer film such that the inner surfaces are in contact with each other, and then stretching the cylindrical multilayer film; and Step (III): cutting at least a part of the cylindrical multilayer film after stretching to give a flat multilayer film.

Effects of the Invention

According to the present invention, there can be provided a multilayer film comprising an EVOH layer as the outermost layer, which maintains excellent gas barrier properties while suppressing blocking of the EVOH-containing layers each other even during stretching after inflation molding; a method for producing the multilayer film; a vapor deposition multilayer film made of the multilayer film; a multilayer structure made of the multilayer film or the vapor deposition multilayer film; and a packaging material having the multilayer structure. In this specification, performance of "suppressing blocking of the EVOH-containing layers each other even during stretching after inflation molding" is sometimes simply referred to as "blocking resistance".

MODES FOR CARRYING OUT THE INVENTION

A multilayer film of the present invention has a resin composition (A) layer comprising EVOH (a1) and EVOH (a2) as well as a thermoplastic resin (B) layer, wherein the resin composition (A) layer is the outermost layer and wherein the multilayer film is stretched at least uniaxially by 3 times or more and 12 times or less.

<Resin Composition (A) Layer)>

The multilayer film of the present invention has a resin composition (A) layer as the outermost layer, which tends to improve blocking resistance while maintaining gas barrier properties. In addition, since the resin composition (A) layer has sufficient affinity for an inorganic vapor deposited (D) layer described later, a vapor deposited multilayer film with the inorganic vapor deposited (D) layer adjacent to the surface of the resin composition (A) layer exhibits good gas barrier properties, and especially when subjected to physical stress such as bending, gas barrier properties tend to be maintained. From the viewpoint of producing such a vapor deposition multilayer film, it is preferable that the resin composition (A) layer is the outermost layer. The resin composition (A) layer comprises EVOH (a1) and EVOH (a2), so that the multilayer film of the present invention tends to have excellent blocking resistance. There can be multiple resin composition (A) layers. When there are multiple resin composition (A) layers, the phrase "having the resin composition (A) layer as the outermost layer" means that at least one resin composition (A) layer is formed in the outermost layer.

EVOH (a1) and EVOH (a2) can be usually obtained by saponifying an ethylene-vinyl ester copolymer. Production and saponification of an ethylene-vinyl ester copolymer can be performed by known methods. A vinyl ester is typically vinyl acetate, but can be selected from other fatty acid vinyl esters such as vinyl formate, vinyl propionate, vinyl valerate, vinyl caprate, vinyl laurate, vinyl stearate, vinyl pivalate and vinyl versatate.

An ethylene unit content of EVOH (a1) is 20 mol % or more, preferably 22 mol % or more, more preferably 25 mol % or more, further preferably 28 mol % or more. An ethylene unit content of EVOH (a1) is 60 mol % or less, preferably less than 40 mol %, more preferably 37 mol % or less, further preferably 34 mol % or less, optionally 32 mol % or less. With the ethylene unit content of EVOH (a1) being 20 mol % or more, melt formability and gas barrier properties under higher humidity tend to be improved, while with the ethylene unit content being 60 mol % or less, gas barrier properties tend to be improved. An ethylene unit content of EVOH can be determined by nuclear magnetic resonance (NMR) method.

There are no particular restrictions to an ethylene unit content of EVOH (a2) as long as it is more than that of EVOH (a1); for example, it can be 20 mol % or more and 60 mol % or less. An ethylene unit content of EVOH (a2) is preferably 40 mol % or more, more preferably 42 mol % or more. Furthermore, an ethylene unit content of EVOH (a2) is preferably 55 mol % or less, more preferably 50 mol % or less. With the ethylene unit content of EVOH (a2) being 20 mol % or more, melt formability tends to be improved, while with the ethylene unit content being 60 mol % or less, gas barrier properties tend to be improved.

There are no particular restrictions to a difference between ethylene unit contents of EVOH (a2) and EVOH (a1) as long as the former is more than the latter, but in the light of improving blocking resistance while maintaining gas barrier properties, a difference in an ethylene unit content (a2-a1) between EVOH (a2) and EVOH (a1) is preferably 3 mol % or more, more preferably 6 mol % or more, further preferably 8 mol % or more. An ethylene unit content difference (a2-a1) can be 30 mol % or less or 20 mol % or less.

In the light of balancing between gas barrier properties of a multilayer film of the present invention and appearance properties after stretching (preventing rough film surface), it is preferable that in the resin composition (A) layer, an ethylene unit content of EVOH (a1) is less than 40 mol % and an ethylene unit content EVOH (a2) is 40 mol % or more; it is more preferable that an ethylene unit content of EVOH (a1) is less than 37 mol % and an ethylene unit content of EVOH (a2) is 42 mol % or more.

A saponification degree of vinyl ester units of EVOH (a1) and EVOH (a2) is preferably 90 mol % or more, more preferably 98 mol % or more, further preferably 99 mol % or more, optionally 100 mol %. A saponification degree of EVOH can be determined by nuclear magnetic resonance (NMR) method.

EVOH (a1) and EVOH (a2) may have units derived from monomers other than ethylene, a vinyl ester and saponified products thereof as long as these do not impair the objectives of the invention. When EVOH (a1) and EVOH (a2) have other monomer units described above, a content of units of the other monomers described above to the whole structural units of EVOH (a1) and EVOH (a2) is preferably 30 mol % or less, more preferably 20 mol % or less, further preferably 10 mol % or less, particularly preferably 5 mol % or less. Furthermore, when EVOH (a1) and EVOH (a2) contain units derived from the other monomers described above, its lower limit can be 0.05 mol % or 0.10 mol %. Examples of the other monomers described above include alkenes such as propylene, butylene, pentene and hexene; ester-containing alkenes such as 3-acyloxy-1-propene, 3-acyloxy-1-butene, 4-acyloxy-1-butene, 3,4-diacyloxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-acyloxy-1-pentene, 5-acyloxy-1-pentene, 4,5-diacyloxy-1-pentene, 4-acyloxy-1-hexene, 5-acyloxy-1-hexene, 6-acyloxy-1-hexene, 5,6-diacyloxy-1-hexene and 1,3-diacetoxy-2-methylenepropane, or saponified products thereof; unsaturated acids such as acrylic acid, methacrylic acid, crotonic acid and itaconic acid, or anhydrides, salts or mono- or di-alkyl esters thereof; nitriles such as acrylonitrile and methacrylonitrile; amides such as acrylamide and methacrylamide; olefinic sulfonic acids such as vinylsulfonic acid, allylsulfonic acid and methallylsulfonic acid, or salts thereof; vinylsilane compounds such as vinyltrimethoxysilane, vinyltriethoxysilane, vinyltri(β-methoxy-ethoxy) silane and γ-methacryloxypropylmethoxysilane; alkyl vinyl ethers; vinyl ketone; N-vinylpyrrolidone; vinyl chloride; and vinylidene chloride.

EVOH (a1) and EVOH (a2) can be post-modified by an appropriate method such as urethanization, acetalization, cyanoethylation and oxyalkylenation.

For EVOH (a1), a melt flow rate (MFR) at 210° C. under a load of 2160 g in accordance with JIS K 7210:2014 is preferably 1.0 g/10 min or more, more preferably 3.0 g/10 min or more, further preferably 6.0 g/10 min or more. With a MFR of EVOH (a1) being the lower limit or more described above, flowability of a resin during inflation molding is so improved that die lip deposition tends to be suppressed. Furthermore, an MFR of EVOH (a1) can be 30.0 g/10 min or less or 20.0 g/10 min or less.

For EVOH (a2), a melt flow rate (MFR) at 210° C. under a load of 2160 g in accordance with JIS K 7210:2014 is preferably 3.0 g/10 min or more, more preferably 5.0 g/10 min or more, further preferably 7.0 g/10 min or more, particularly preferably 10.0 g/10 min or more. With a MFR of EVOH (a2) being the lower limit or more described above, flowability of a resin during inflation molding is so improved that die lip deposition tends to be suppressed. Furthermore, an MFR of EVOH (a2) can be 30.0 g/10 min or less or 20.0 g/10 min or less.

In the light of preventing die lip deposition during inflation molding, an MFR at 210° C. under a load of 2160 g as determined in accordance with JIS K 7210:2014 for at least one of EVOH (a1) and EVOH (a2) contained in a resin composition (A) layer is preferably 5 to 30 g/10 min, more preferably 7 to 25 g/10 min. Furthermore, in the light of more preventing die lip deposition, an MFR at 210° C. under a load of 2160 g as determined in accordance with JIS K 7210:2014 for both EVOH (a1) and EVOH (a2) contained in a resin composition (A) layer is preferably 5 to 30 g/10 min, more preferably 7 to 25 g/10 min.

A mass ratio [a1/a2] of EVOH (a1) and EVOH (a2) in a resin composition (A) layer is preferably 2/98 or more, more preferably 40/60 or more, further preferably 57/43 or more, even more preferably 70/30 or more, particularly preferably 75/25 or more. With the mass ratio [a1/a2] being 2/98 or more, blocking resistance tends to be improved. The mass ratio [a1/a2] is preferably 98/2 or less, more preferably 96/4 or less, further preferably 92/8 or less. With the mass ratio [a1/a2] being 98/2 or less, blocking resistance tends to be improved.

EVOH (a1) and EVOH (a2) can be used alone or in combination of two or more. A resin composition (A) layer can further contain another EVOH having an ethylene unit content different from that of EVOH (a1) or EVOH (a2).

A resin composition (A) layer can contain other components including anti-blocking agents, process aids, resins other than EVOH (a1) and EVOH (a2), carboxylic acid compounds, phosphoric acid compounds, boron compounds, metal salts, stabilizers, antioxidants, UV absorbers, plasticizers, antistatic agents, lubricants, colorants, fillers, surfactants, drying agents, cross-linking agents, and reinforcing agents such as various fibers, as long as the effects of the present invention are not impaired.

Examples of an anti-blocking agent include inorganic oxides, inorganic nitrides and inorganic oxynitrides such as those of silicon, aluminum, magnesium, zirconium, cerium, tungsten and molybdenum. Among these, silicon oxide is desirable because of its availability. A blocking resistance tends to be further improved when the resin composition (A) layer contains an anti-blocking agent.

Examples of a process aid include fluorinated process aids such as Kynar™ from Arkema S. A. and Dynamar™ from 3M. Die lip deposition tends to be more effectively prevented when resin composition (A) layer contains a process aid.

Examples of resins other than EVOH (a1) and EVOH (a2) include polyolefins, polyamides, polyvinyl chlorides, polyvinylidene chlorides, polyesters, polystyrenes, epoxy resins, acrylic resins, urethane resins, and polyester resins. These resins can be acid-modified resins.

When the resin composition (A) layer contains a carboxylic acid compound, coloration during melt molding tends to be inhibited. The carboxylic acid can be a monocarboxylic acid, a polycarboxylic acid or a combination thereof. The carboxylic acid can be ionic, and such a carboxylic acid ion can form a salt with a metal ion.

When the resin composition (A) layer contains a phosphoric acid compound, coloration during melt molding tends to be inhibited. Examples of the phosphoric acid compound include, but not limited to, various acids such as phosphoric acid and phosphorous acid, and salts thereof. A phosphate salt can be contained as any of a phosphate monosalt, a phosphate disalt and a phosphate trisalt, preferably as a phosphate monosalt, in which a cationic species is preferably, but not limited to, an alkali metal. Among these, preferred are sodium dihydrogen phosphate and potassium dihydrogen phosphate. When the resin composition (A) layer contains a phosphoric acid compound, a content of the phosphoric acid compound is preferably 5 to 200 ppm in terms of a phosphoric acid radical. With a content of the phosphoric acid compound being 5 ppm or more, coloring resistance during melt molding tends to be improved. With a content of the phosphoric acid compound being 200 ppm or less, melt formability tends to be improved, and the content is more preferably 160 ppm or less.

When the resin composition (A) layer contains a boron compound, torque fluctuation during heating and melting tends to be suppressed. Examples of the boron compound include, but not limited to, boric acids, boric acid esters, boric acid salts and boron hydrides. Specific examples include boric acids such as orthoboric acid, metaboric acid and tetraboric acid; boric acid esters such as triethyl borate and trimethyl borate; boric acid salts such as alkali metal salts and alkaline earth metal salts of the above boric acids; and borax. Among these compounds, orthoboric acid (hereinafter, sometimes simply referred to as "boric acid") is preferable. When the resin composition (A) layer contains a boron compound, a content of the boron compound is preferably 20 to 2000 ppm in terms of a boron element. With a content of the boron compound being 20 ppm or more, torque fluctuation during heating and melting tends to be suppressed, and the content is more preferably 50 ppm or more. Meanwhile, with a content of the boron compound being 2000 ppm or less, moldability tends to be improved, and the content is more preferably 1000 ppm or less.

When the resin composition (A) layer contains an alkali metal salt, interlayer adhesiveness between the resin composition (A) layer and another resin layer (for example, a thermoplastic resin (B) layer or an adhesive resin (C) layer) in a multilayer film of the present invention tends to be improved. A cationic species for an alkali metal salt is preferably, but not limited to, sodium or potassium. There are also no restrictions to an anionic species for an alkali metal salt. It can be added as a carboxylate, a carbonate, a hydrogen carbonate, a phosphate, a hydrogen phosphate, a hydrochloride, a nitrate, a sulfate, a borate or a hydroxide. When the resin composition (A) layer contains an alkali metal salt, a content of the alkali metal salt is preferably 10 to 500 ppm in terms of a metal element. The content of the alkali metal salt is more preferably 50 ppm or more. Meanwhile, with a content of the alkali metal salt being 500 ppm or less, melt stability tends to be improved, and the content is more preferably 300 ppm or less.

When the resin composition (A) layer contains an alkaline earth metal salt, degradation of the resin and generation of degraded materials such as a gel during repeated melt molding tend to be suppressed. Examples of a cationic species for the alkaline earth metal salt include preferably, but not limited to, magnesium and calcium. There are also no particular restrictions to an anionic species for the alkaline earth metal salt. It can be added as a carboxylate, a carbonate, a hydrogen carbonate, a phosphate, a hydrogen phosphate, a hydrochloride, a nitrate, a sulfate, a borate or a hydroxide.

Examples of a stabilizer for improving melt stability or the like include hydrotalcite compounds, hindered phenol thermal stabilizers, hindered amine thermal stabilizers, metal salts of a higher aliphatic carboxylic acid (for example, calcium stearate, magnesium stearate, and the like). When the resin composition (A) layer contains a stabilizer, its content is preferably 0.001 to 1 mass %.

Examples of an antioxidant include 2,5-di-t-butyl-hydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl) propionate, and 4,4'-thiobis-(6-t-butylphenol).

Examples of a UV absorber include ethylene-2-cyano-3',3'-diphenylacrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, and 2,2'-dihydroxy-4-methoxybenzophenone.

Examples of a plasticizer include dimethyl phthalate, diethyl phthalate, dioctyl phthalate, wax, liquid paraffin, and phosphate esters.

Examples of an antistatic agent include pentaerythritol monostearate, sorbitan monopalmitate, sulfated polyolefins, polyethylene oxide, and carbowax.

Examples of a lubricant include ethylenebisstearamide and butyl stearate.

Examples of a colorant include carbon black, phthalocyanine, quinacridone, indoline, azo pigments, and bengalla.

Examples of a filler include fiberglass, asbestos, ballastite, and calcium silicate.

A proportion of EVOH (a1) and EVOH (a2) as a resin constituting the resin composition (A) layer is preferably 80 mass % or more, more preferably 90 mass % or more, further preferably 95 mass % or more, particularly preferably 98 mass % or more, and a resin constituting the resin composition (A) layer can essentially consist of EVOH (a1) and EVOH (a2), and can consist of EVOH (a1) and EVOH (a2). Furthermore, a proportion of EVOH (a1) and EVOH (a2) in the resin composition (A) layer is preferably 80 mass % or more, more preferably 90 mass % or more, further preferably 95 mass % or more, particularly preferably 98 mass % or more, and the resin composition (A) layer can essentially consist of EVOH (a1) and EVOH (a2), and can consist of EVOH (a1) and EVOH (a2).

A thickness of the resin composition (A) layer is preferably 0.5 μm or more, more preferably 0.8 μm or more, optionally 1 μm or more. With a thickness of the resin composition (A) layer being 0.5 μm or more, gas barrier properties tends to be improved. A thickness of the resin composition (A) layer is preferably 20 μm or less, more preferably 10 μm or less, optionally 5 μm or less. With a thickness of the resin composition (A) layer being 20 μm or less, appearance properties after stretching (film surface) tends to be improved. Here, a suitable thickness of the resin composition (A) layer described above means a thickness after stretching.

A ratio of a thickness of the resin composition (A) layer to the total thickness of all layers of the multilayer film of the present invention can be preferably 30% or less, more preferably 20% or less, optionally, 10% or less or 5% or less in the light of industrial productivity and mechanical properties. In the light of further improving gas barrier properties, a multilayer film of the present invention can contain EVOH layer(s) other than the resin composition (A) layer, and there are no particular restrictions to the number of the layers.

<Thermoplastic Resin (B) Layer>

The thermoplastic resin (B) layer contained in the multilayer film of the present invention improves mechanical strength and barrier property against moisture of the multilayer film of the present invention. By forming the layer and a resin composition (A) layer as a multilayer film, a thickness of the resin composition (A) layer tends to be able to be reduced, which can allow the multilayer structure of the present invention described later to be easily recycled. Furthermore, depending on the type of a thermoplastic resin constituting the thermoplastic resin (B) layer, particular properties such as heat sealability and mechanical strength can be provided. Examples of a thermoplastic resin which can be used for the thermoplastic resin (B) layer include polyolefins including homopolymers or copolymers of an olefin such as polyethylenes such as linear low-density polyethylenes, low-density polyethylenes, ultra-low-density polyethylene, medium-density polyethylene, and high-density polyethylene, ethylene-vinyl acetate copolymers, ionomers, ethylene-propylene (block or random) copolymers, ethylene-(meth)acrylic acid copolymers, ethylene-(meth) acrylate ester copolymers, polypropylenes, propylene-α-olefin copolymers, polybutenes, and polypentenes, or those graft-modified with an unsaturated carboxylic acid or an ester thereof; polyesters; polyamides (including copolymerized polyamide); polyvinyl chlorides; polyvinylidene chlorides; acrylic resins; polystyrenes; polyvinyl esters; polyester elastomers; polyurethane elastomers; chlorinated polystyrenes; chlorinated polypropylenes; aromatic polyketones or aliphatic polyketones, and polyalcohols produced by reduction thereof; polyacetals; and polycarbonates. Among these, polyolefins are preferable in the light of heat sealability and mechanical properties. Meanwhile, the thermoplastic resin (B) layer preferably contains polyethylene as a main component in the light of improving recyclability of the multilayer structure containing the multilayer film of the present invention. Here, "main component" means a component contained in the thermoplastic resin (B) layer in an amount of more than 50 wt %. A proportion of polyethylene in the thermoplastic resin (B) layer is preferably 80 mass % or more, more preferably 90 mass % or more, and further preferably, the thermoplastic resin (B) layer consists of polyethylene. Whether or not having gas barrier properties, polyethylene are extensively used as a packaging material, so that many countries widely have good recycle infrastructures for polyethylene. Polyethylene is preferably used because it can be molded at a lower temperature, heat-sealed at a lower temperature and stronger than polypropylene. When the thermoplastic resin (B) layer contains polyethylene as a main component, the polyethylene is preferably at least one selected from linear low-density polyethylenes, low-density polyethylenes, medium-density polyethylenes and high-density polyethylenes; and more preferably, at least one selected from linear low-density polyethylenes and low-density polyethylenes, or a mixture of at least one selected from linear low-density polyethylenes and low-density polyethylenes with a high-density polyethylene.

A proportion of the thermoplastic resin in the thermoplastic resin (B) layer is preferably 80 mass % or more, more preferably 90 mass % or more, further preferably 95 mass % or more, particularly preferably 98 mass % or more, and the thermoplastic resin (B) layer can essentially consist of the thermoplastic resin, and can consist of the thermoplastic resin.

A melt flow rate (MFR) of the thermoplastic resin constituting the thermoplastic resin (B) layer as determined in accordance with JIS K 7210:2014 at 190° C. under a load of 2160 g is preferably 0.10 to 10.0 g/10 min, more preferably 0.30 to 5.0 g/10 min. With an MFR of the thermoplastic resin constituting the thermoplastic resin (B) layer being within the above range, molding stability during inflation molding tends to be improved.

A thickness of the thermoplastic resin (B) layer is preferably 7 to 100 μm, more preferably 10 to 50 μm in the light of industrial productivity and mechanical properties. Here, a preferable thickness of the thermoplastic resin (B) layer is a thickness after stretching. When the thermoplastic resin (B) layer has a plurality of layers, the total thickness of the layers is preferably within the above range.

In the multilayer film of the present invention, the thermoplastic resin (B) layer can be a monolayer or multiple layers. Here, when the plural thermoplastic resin (B) layers are formed and the thermoplastic resin (B) layers made of the same material are laminated in succession, they are regarded as one layer. For example, for a multilayer film of thermoplastic resin (B) layer/thermoplastic resin (B) layer/thermoplastic resin (B) layer/adhesive resin (C) layer/resin composition (A) layer, the thermoplastic resin (B) layers are made of the same material, the multilayer film is regarded as a multilayer film of thermoplastic resin (B) layer/adhesive resin (C) layer/resin composition (A) layer, and a thickness of one thermoplastic resin (B) layer is the total thickness of the three layers. Meanwhile, if the thermoplastic resin (B) layers are made of different materials in the above example, these are considered to be individually independent layers. Here, the symbol "/" used in the structural example of the multilayer film described above means that the layers in both sides are directly laminated.

<Adhesive Resin (C) Layer>

In the light of improving appearance property (film surface) after stretching the multilayer film of the present invention and maintaining quality stability, it is preferable that the multilayer film of the present invention has an adhesive resin (C) layer, and it is more preferable that the resin composition (A) layer and the thermoplastic resin (B) layer are laminated via the adhesive resin (C) layer. Furthermore, when the multilayer structure of the present invention described later is recycled, the presence of the adhesive resin (C) layer tends to enhance compatibility between the resin composition (A) layer and the thermoplastic resin (B) layer, and to improve recyclability. In this light, the presence of the adhesive resin (C) layer is preferable. An adhesive resin constituting the adhesive resin (C) layer is preferably a polyolefin having a carboxy group, a carboxylic anhydride group or an epoxy group, more preferably a polyolefin having a carboxylic anhydride group. Such an adhesive resin exhibits excellent adhesiveness to the resin composition (A) layer or the thermoplastic resin (B) layer.

An example of a polyolefin having a carboxy group is a polyolefin prepared by copolymerizing acrylic acid, methacrylic acid or the like. Here, as represented by an ionomer, all or part of the carboxyl groups contained in the polyolefin can be present in the form of metal salts. An example of a polyolefin having a carboxylic anhydride group is a polyolefin graft-modified with maleic anhydride or itaconic acid. An example of a polyolefin having an epoxy group is a polyolefin prepared by copolymerization of glycidyl methacrylate. Among these, preferred are a polyolefin having a carboxylic anhydride group such as maleic anhydride, particularly preferably a polyethylene having a carboxylic anhydride group.

A melt flow rate (MFR) of the adhesive resin constituting the adhesive resin (C) layer as determined in accordance with JIS K 7210:2014 at 190° C. under a load of 2160 g is preferably 0.1 to 20.0 g/10 min, more preferably 1.0 to 10.0 g/10 min. With an MFR of the thermoplastic resin (C) being within the above range, molding stability during inflation molding tends to be improved.

A thickness of the adhesive resin (C) layer is preferably 0.5 to 20 μm, more preferably 1 to 10 μm in the light of industrial productivity and quality stability. Here, a preferable thickness of the adhesive resin (C) layer is a thickness after stretching. When the multilayer film of the present invention has a plurality of the resin composition (A) layers and the thermoplastic resin (B) layers, or has an EVOH layer other than the resin composition (A) layer, the adhesive resin (C) layer can be formed between the layers, and there are no particular restrictions to the number of the adhesive resin (C) layers in the multilayer film of the present invention.

<Multilayer Film>

There are no particular restrictions to a layer structure of the multilayer film of the present invention as long as the resin composition (A) layer is the outermost layer and the thermoplastic resin (B) layer is formed, and for example, the following multilayer film structures are exemplified. Here, a resin composition (A) layer is denoted as "layer (A)", a thermoplastic resin (B) layer is denoted as "layer (B)", and an adhesive resin (C) layer is denoted as "layer (C)". In the following examples, the adhesive resin (C) layer can be absent, but the adhesive resin (C) layer is preferably present in the light of quality stability and recyclability. Here, the symbol "/" means that the layers in both sides are directly laminated. Examples of a layer structure of the multilayer film of the present invention include layer (B)/layer (C)/layer (A); layer (B)/layer (C)/layer (A)/layer (C)/layer (A); layer (A)/layer (C)/layer (B)/layer (C)/layer (A); and layer (B)/layer (C)/layer (A)/layer (C)/layer (B)/layer (C)/layer (A), and among these, layer (B)/layer (C)/layer (A) is preferable in the light of industrial productivity.

A total thickness of the multilayer film of the present invention can be determined depending on an application. The total thickness is preferably 10 μm or more, more preferably 15 μm or more. With the total thickness being 10 μm or more, industrial productivity and mechanical properties tend to be improved. The total thickness is preferably 100 μm or less, more preferably 50 μm or less. With the total thickness being 100 μm or less, industrial productivity and economic efficiency tend to be improved. Here, a preferable total thickness of the multilayer film described above means a thickness after stretching.

There are no particular restrictions to a method for producing the multilayer film of the present invention, and generally, a conventional extrusion method is used, where each resin is extruded from a separate or common die to form a layer. The die can be either an annular die or a T-die, which is used, for example, in cast molding, inflation molding or the like. The multilayer film is preferably produced by inflation molding using an annular die, in the light of an effect of the present invention that blocking between resin composition (A) layers is prevented during stretching while the resin composition (A) layers are in contact with each other. Furthermore, inflation molding is also advantageous in cost. That is, the multilayer film of the present invention is preferably an inflation molded article. Herein, an inflation molded article means an article molded via inflation molding. For example, a packaging container or the like produced via film formation by inflation molding and then secondary processing (for example, press molding or the like) also corresponds to an inflation molded article. Here, the effect of blocking resistance of the present invention can be fully obtained in case of stretching while resin composition (A) layers are in contact with each other. A production method of the present invention preferably comprises a step of conducting stretching while resin composition (A) layers are in contact with each other, such as stretching a multilayer film obtained by cast molding while the film is folded such that resin composition (A) layers are in contact with each other.

When inflation molding is used in production of a multilayer film of the present invention, an inflation molding method can be conducted by a known means.

The multilayer film of the present invention is stretched at least uniaxially by 3 times or more and 12 times or less. If stretching of the multilayer film of the present invention is less than 3 times, uneven thickness due to stretching and deterioration in gas barrier properties tend to occur. Meanwhile, if stretching of the multilayer film of the present invention is more than 12 times, a film surface after stretching tends to be deteriorated. The multilayer film of the present invention is preferably stretched at least uniaxially by 4 times or more, more preferably 5 times or more. Furthermore, the multilayer film of the present invention is preferably stretched at least uniaxially by 10 times or less, more preferably 8 times or less. The multilayer film of the present invention can be stretched uniaxially or biaxially, and in the light of economic efficiency and tearability of the multilayer film (when being used as a packaging material, the packaging material can be easily opened), uniaxial stretching is preferable, and uniaxial stretching in a longitudinal direction (MD direction) is more preferable. Here, it is preferably not substantially stretched in a width direction (TD direction). Furthermore, when the multilayer film of the present invention is biaxially stretched, it is preferably stretched mainly in a longitudinal direction (MD direction), and a ratio (MD/TD) of stretch magnification in a longitudinal direction (MD direction) to stretch magnification in a width direction (TD direction) is preferably 3 or more, more preferably 4 or more, further preferably 5 or more. The stretch magnification ratio (MD/TD) can be 12 or less. If a stretch magnification ratio is less than 3, blocking tends to be inhibited even when the film is stretched while the resin composition (A) layers are in contact with each other, and therefore, merit of applying the present invention becomes insignificant.

Examples of a method for stretching the multilayer film of the present invention include, but not limited to, tenter stretching, tubular stretching, and roll stretching. In the light of a production cost, uniaxial stretching by roll stretching is preferable. When the multilayer film of the present invention is an inflation molded article, roll stretching is preferable in the light of easy uniaxial stretching of a cylindrical multilayer film folded after inflation molding.

A method for producing the multilayer film of the present invention preferably comprises Step (I): forming a cylindrical multilayer film comprising the resin composition (A) layer and the thermoplastic resin (B) layer, wherein the outermost layer of the inner side is the resin composition (A) layer, by inflation molding; Step (II): folding the cylindrical multilayer film such that the inner surfaces are in contact with each other, and then stretching the cylindrical multilayer film; and Step (III): cutting at least a part of the cylindrical multilayer film after stretching to give a flat multilayer film. There will be detailed preferable production methods of the present invention, but aspects of the present invention are not limited to these.

In Step (I), a resin composition containing EVOH (a1) and EVOH (a2) and a thermoplastic resin are melt-extruded from an annular die to mold a cylindrical multilayer film. In molding a cylindrical film, it is preferable in the light of suppressing thermal degradation of EVOH and die lip deposition that a resin composition (A) layer is the outermost layer in the inner side. If the resin composition (A) layer is the outermost layer in the outer side, the problem of blocking in the stretching step described later can be eliminated, but there may arise concerns about thermal degradation of EVOH associated with increase in a melt time due to elongation of a flow path. Furthermore, as described later, in inflation molding, a gas is fed to the inner space of the cylindrical multilayer film, to inflate the multilayer film, so that EVOH tends to deposit on the die lip, for example, die lip deposition tends to increase, compared with the case where the resin composition (A) layer is the outermost layer in the inner side.

In the melt-extruded cylindrical multilayer film, a gas is fed to the inner space and the film is inflated to a given size due to an inner pressure. The inflated cylindrical multilayer film is folded by a pair of nip rolls such that the inner sides are in contact with each other, and is rolled up. Here, there are no particular restrictions to the conditions such as a blow-up ratio indicating an inflation degree and a taking-off speed during rolling up, and known conditions can be selected as appropriate.

In Step (II), the multilayer film folded in Step (I) is stretched at least uniaxially.

In uniaxial stretching, roll stretching is suitably used. A temperature during stretching is generally within the range of 50° C. to 130° C.

In biaxial stretching, tenter stretching is suitably used. When simultaneous biaxial stretching is conducted at a temperature within the range of 70° C. to 100° C., a biaxial stretching film with less stretching unevenness is obtained. In sequential biaxial stretching, a temperature of 70° C. to 100° C. in a longitudinal direction of the roll and of 80° C. to 120° C. in a width direction of the roll can be employed to give a biaxial stretching film with less stretching unevenness.

In Step (III), at least a part of the cylindrical multilayer film after stretching is cut to give a flat multilayer film. In the multilayer film of the present invention obtained via Step (III), for example, when a vapor deposition multilayer film or multilayer structure as described later is produced, other layer(s) (inorganic vapor deposition (D) layer or thermoplastic resin (E) layer) tend to be easily laminated on the resin composition (A) layer as the outermost layer.

A preferable embodiment of the multilayer film is a vapor deposition multilayer film, in which the inorganic vapor deposition (D) layer is adjacent to the exposed surface side of the resin composition (A) layer in the multilayer film of the present invention. Here, "adjacent" means they are directly in contact with each other. Since the resin composition (A) layer has higher affinity for the inorganic vapor deposition (D) layer, the vapor deposition multilayer film of the present invention has high gas barrier properties, and even when being subject to physical stress such as bending, good gas barrier properties tend to be maintained.

<Inorganic Vapor Deposition (D) Layer>

An inorganic vapor deposition (D) layer is generally a layer having barrier properties against oxygen and moisture. Therefore, with the inorganic vapor deposition (D) layer, the vapor deposition multilayer film of the present invention tends to have good gas barrier properties. The inorganic vapor deposition (D) layer can be formed by vapor deposition of an inorganic material. Examples of inorganic materials include metals (for example, aluminum), metal oxides (for example, silicon oxide, aluminum oxide), metal nitrides (for example, silicon nitride), metal nitrided oxides (for example, silicon nitrided oxide), or metal carbonitride (for example, silicon carbonitride). Among these, an inorganic vapor deposition (D) layer made of aluminum, aluminum oxide, silicon oxide, magnesium oxide or silicon nitride is preferable in the light of industrial productivity, and an inorganic vapor deposition (D) layer made of aluminum is more preferable. Here, even when it is an aluminum metal vapor deposition layer, irreversible oxidation may occur, so that aluminum oxide may be present in part. When the metal vapor deposition layer contains aluminum oxide in part, a ratio ($O_{mol}/Al_{mol}$) of a substance quantity of oxygen atoms ($O_{mol}$) to a substance quantity of aluminum atoms ($Al_{mol}$) constituting the metal vapor deposition layer is preferably 0.5 or less, more preferably 0.3 or less, further preferably 0.1 or less, particularly preferably 0.05 or less.

There are no particular restrictions to a method for producing an inorganic vapor deposition (D) layer; and examples are vacuum vapor deposition (for example, resistance heating vapor deposition, electron beam vapor deposition, molecular beam epitaxy), physical vapor deposition such as sputtering and ion plating; thermochemical vapor deposition (for example, catalyst chemical vapor deposition), photochemical vapor deposition, plasma chemical vapor deposition (for example, capacity coupling plasma, induction coupling plasma, surface wave plasma, electron cyclotron resonance, dual magnetron, atomic layer deposition process); and chemical vapor deposition such as organic metal vapor deposition.

The inorganic vapor deposition (D) layer is formed such that it is adjacent to the exposed surface side of the resin composition (A) layer of the multilayer film of the present invention. With the inorganic vapor deposition (D) layer being formed in the resin composition (A) layer, gas barrier properties, even after physical stress such as bending, tends to be improved. An average thickness of the inorganic vapor deposition (D) layer is preferably 150 nm or less, more preferably 120 nm or less, further preferably 100 nm or less. An average thickness of the inorganic vapor deposition (D) layer is preferably 10 nm or more, more preferably 15 nm or more, further preferably 20 nm or more. Here, an average thickness of the inorganic vapor deposition (D) layer is an average of thicknesses at given 10 points in a cross section of the inorganic vapor deposition (D) layer as determined by an electron microscope. In the light of reducing coloration of collected composition of the multilayer structure, the total thickness of the inorganic vapor deposition (D) layer is preferably 1 μm or less in case that the multilayer structure has a plurality of inorganic vapor deposition (D) layers.

There are no particular restrictions to a layer structure of the vapor deposition multilayer film of the present invention as long as the inorganic vapor deposition (D) layer is adjacent to the exposed surface of the resin composition (A) layer in the multilayer film of the present invention;, and examples include layer (B)/layer (C)/layer (A)/layer (D); layer (B)/layer (C)/layer (A)/layer (C)/layer (A)/layer (D); layer (A)/layer (C)/layer (B)/layer (C)/layer (A)/layer (D); and layer (B)/layer (C)/layer (A)/layer (C)/layer (B)/layer (C)/layer (A)/layer (D). Among these, in the light of industrial productivity, layer (B)/layer (C)/layer (A)/layer (D) is preferable.

<Thermoplastic Resin (E) Layer>

The multilayer film and the vapor deposition multilayer film of the present invention can be a multilayer structure further comprising a thermoplastic resin (E) layer. With the multilayer structure of the present invention having the thermoplastic resin (E) layer, a film thickness ratio of the resin composition (A) layer in the multilayer structure of the present invention tends to be able to be reduced, which can allow the multilayer structure of the present invention described later to be easily recycled. Furthermore, depending on the type of a thermoplastic resin constituting the thermoplastic resin (E) layer, particular properties such as heat sealability and mechanical strength can be provided. Here, when the thermoplastic resin (E) layer is laminated on the vapor deposition multilayer film of the present invention to give the multilayer structure of the present invention, it is preferable that the thermoplastic resin (E) layer is formed in the exposed surface side of the inorganic vapor deposition (D) layer of the vapor deposition multilayer film, and it is more preferable that an adhesive layer is formed between the inorganic vapor deposition (D) layer and the thermoplastic resin (E) layer. Examples of a thermoplastic resin which can be used for the thermoplastic resin (E) layer include polyolefins including homopolymers or copolymers of an olefin such as polyethylenes such as linear low-density polyethylenes, low-density polyethylenes, ultra-low-density polyethylene, medium-density polyethylene, and high-density polyethylene, ethylene-vinyl acetate copolymers, ionomers, ethylene-propylene (block or random) copolymers, ethylene-(meth)acrylic acid copolymers, ethylene-(meth)acrylate ester copolymers, polypropylenes, propylene-α-olefin copolymers, polybutenes, and polypentenes, or those graft-modified with an unsaturated carboxylic acid or an ester thereof; polyesters; polyamides (including copolymerized polyamide); polyvinyl chlorides; polyvinylidene chlorides; acrylic resins; polystyrenes; polyvinyl esters; polyester elastomers; polyurethane elastomers; chlorinated polystyrenes; chlorinated polypropylenes;

aromatic polyketones or aliphatic polyketones, and polyalcohols produced by reduction thereof; polyacetals; and polycarbonates. Among these, polyolefins are preferable in the light of heat sealability. Meanwhile, the thermoplastic resin (E) layer preferably contains polyethylene as a main component in the light of improving recyclability of the multilayer structure of the present invention, and it more preferably consists of polyethylene. Whether or not having gas barrier properties, polyethylene is extensively used as a packaging material, so that many countries widely have good recycle infrastructures for polyethylene. Polyethylene is preferably used because it can be molded at a lower temperature, heat-sealed at a lower temperature and stronger than polypropylene. When the thermoplastic resin (E) layer contains polyethylene as a main component, the polyethylene is preferably at least one selected from linear low-density polyethylenes, low-density polyethylenes, medium-density polyethylenes and high-density polyethylenes; and more preferably, at least one selected from linear low-density polyethylenes and low-density polyethylenes, or a mixture of at least one selected from linear low-density polyethylenes and low-density polyethylenes with a high-density polyethylene.

Examples of a configuration of the multilayer structure of the present invention include layer (E)/layer (B)/layer (C)/layer (A); layer (E)//layer (B)/layer (C)/layer (A)//layer (E); layer (B)/layer (C)/layer (A)/layer (E); layer (E)/layer (B)/layer (C)/layer (A)/layer (D); layer (E)/layer (B)/layer (C)/layer (A)/layer (D)//layer (E); and layer (B)/layer (C)/layer (A)/layer (D)//layer (E). Among these, in the light of particularly excellent gas barrier properties and forming a layer for printing on the multilayer structure and a heat-seal layer, layer (E)/layer (B)/layer (C)/layer (A)/layer (D)/layer (E), or layer (B)/layer (C)/layer (A)/layer (D)/layer (E) are preferable. The symbol "//" as used in the above configuration examples means lamination via an adhesive layer.

A multilayer structure can be produced by laminating the thermoplastic resin (E) layer on the multilayer film or the vapor deposition multilayer film of the present invention, employing any of various known production methods such as dry lamination, sand lamination, extrusion lamination, co-extrusion lamination and solution coating. When the thermoplastic resin (E) layer is laminated, an adhesive layer can be formed between the multilayer film or the vapor deposition multilayer film of the present invention and the thermoplastic resin (E) layer, and such an adhesive layer which can be suitably used can be a known adhesive for lamination such as a two-liquid reaction type polyurethane adhesive in which a polyisocyanate component and a polyol component are blended for initiating a reaction.

The multilayer film, the vapor deposition multilayer film and the multilayer structure of the present invention can have, in addition to the inorganic vapor deposition (D) layer, a vapor deposition layer. Such a vapor deposition layer can be formed using, for example, the thermoplastic resin (B) layer or the thermoplastic resin (E) layer as a substrate. That is, a vapor deposition layer can be formed over the thermoplastic resin (B) layer or the thermoplastic resin (E) layer. Components constituting such a vapor deposition layer can be known components used as a vapor deposition layer as appropriate.

The multilayer structure of the present invention is preferably excellent in recyclability. In recent years, environmental issues and waste problems have triggered a worldwide increase in demand for so-called post-consumer recycling (hereinafter simply referred to as "recycling"), in which packaging materials consumed in the market are collected and recycled. In recycling, the process of cutting the collected packaging materials, sorting and washing them as necessary, and then melt-mixing them using an extruder is generally employed. A polyester film, a polyamide film and the like are difficult to be uniformly mixed with other components in the melt-mixing process when being recovered and recycled, which is an obstacle to recycling. Therefore, in the light of improving recyclability, it is preferable that the thermoplastic resin (B) layer and/or the thermoplastic resin (E) layer do not contain a polyester or a polyamide. The multilayer film, the vapor deposition multilayer film and the multilayer structure of the present invention are preferably based on a polyolefin such as polyethylene and polypropylene (a main component of the multilayer structure is a polyolefin.), and particularly preferably, they are based on polyethylene from the viewpoint that recycling infrastructure is widely developed in many countries. In general, EVOH has a similar melting temperature to polyolefin and has excellent recyclability, but in order not to affect the mechanical properties of the composition after recycling, a proportion of EVOH in the multilayer structure of the present invention is preferably 20 mass % or less, more preferably 10 mass % or less, further preferably 5 mass % or less. Meanwhile, in the light of improving recyclability, a proportion of a polyolefin in the multilayer structure of the present invention is preferably 80 mass % or more, more preferably 90 mass % or more, further preferably 95 mass % or more. In particular, a proportion of a polyethylene in the multilayer structure of the present invention is preferably 80 mass % or more, more preferably 90 mass % or more, further preferably 95 mass % or more.

The multilayer film, the vapor deposited multilayer film, and the multilayer structure of the present invention can be suitably used as various packaging materials, such as food packaging, medical product packaging, industrial chemical packaging, and agricultural chemical packaging, and in particular, a packaging material having the multilayer structure of the present invention can be suitably used as a packaging material with excellent recyclability.

EXAMPLES

The present invention will be further detailed with reference to Examples, but the present invention is not limited to these examples.

Materials used in Examples and Comparative Examples

EVOH a-1: EVOH with an ethylene unit content of 32 mol %, a saponification degree of 99.9 mol % or more, and an MFR (at 210° C., under a load of 2160 g) of 4.0 g/10 min, a-2: EVOH with an ethylene unit content of 27 mol %, a saponification degree of 99.9 mol % or more, and an MFR (at 210° C., under a load of 2160 g) of 4.0 g/10 min, a-3: EVOH with an ethylene unit content of 44 mol %, a saponification degree of 99.9 mol % or more, and an MFR (at 210° C., under a load of 2160 g) of 12.0 g/10 min, a-4: EVOH with an ethylene unit content of 48 mol %, a saponification degree of 99.9 mol % or more, and an MFR (at 210° C., under a load of 2160 g) of 15.0 g/10 min, a-5: EVOH with an ethylene unit content of 32 mol %, a saponification degree of 99.9 mol % or more, and an MFR (at 210° C., under a load of 2160 g) of 9.0 g/10 min, a-6: EVOH with an ethylene unit content of 35 mol %, a saponification degree of 99.9 mol % or more, and an MFR (at 210° C., under a load of 2160 g) of 19.0 g/10 min, a-7: EVOH with an ethylene unit content of 44 mol %, a saponification degree of 99.9 mol % or more, and an MFR (at 210° C., under a load of 2160 g) of 4.0 g/10 min.

Thermoplastic Resin Used for a Thermoplastic Resin (B) Layer

B-1: "Lumicene™ Supertough 40ST05" (polyethylene, Total S. A., MFR (at 190° C., under a load of 2160 g), 0.50 g/10 min).

Adhesive Resin Used for an Adhesive Resin (C) Layer

C-1: "ADMER™ NF528" (polyethylene-based adhesive resin, Mitsui Chemicals, Inc., MFR (at 190° C., under a load of 2160 g), 2.5 g/10 min).

Film Used as a Thermoplastic Resin (E) Layer

E-1: uniaxially stretched PE film, thickness: 30 μm,

E-2: "UNILUX™ LS-760C" (Idemitsu Unitech Co., Ltd., LLDPE film, thickness: 50 μm)

Evaluation Method (1) Evaluation of Blocking after Stretching

Using multilayer film after stretching obtained in Examples and Comparative Examples, the presence of blocking was visually determined and was evaluated and categorized into the following three levels A, B and C.

Level: Criteria

A: No blockings were observed.

B: Local blocking was observed.

C: Blocking was observed in a wide area.

(2) Evaluation of Die Lip Deposition

After continuous film formation for 1 hour under the conditions of inflation film formation of Examples and Comparative Examples, operation was stopped, and deposition on a die lip surface of a discharge port of a resin composition (A) was observed, and was evaluated and categorized into the following three levels A, B, and C.

Level: Criteria

A: Die lip deposition was not observed.

B: A small amount of die lip deposition was observed.

C: A large amount of die lip deposition was observed.

(3) Evaluation of a Film Surface after Stretching

Appearance of a multilayer film after stretching Examples and Comparative Examples was visually observed, evaluated and categorized into the following three levels A, B, and C.

Level: Criteria

A: Abnormality in the appearance was not observed.

B: Local uneven stretching was observed.

C: Uneven stretching was observed in wide area.

(4) OTR (Oxygen Transmission Rate) Before and After Vapor Deposition (4-1) OTR (Oxygen Transmission Rate) Before Vapor Deposition Using a multilayer film after stretching obtained in Examples and Comparative Examples, an oxygen transmission rate was measured where the resin composition (A) layer was in the oxygen supply side while the thermoplastic resin (B) layer was in the carrier gas side. Specifically, an oxygen transmission rate (unit: cc/(m$^2$·day·atm)) was measured using an oxygen transmission measurement device ("MOCON OX-TRAN2/21", from Modern Control Co., Ltd.) under the conditions of a temperature of 20° C., a humidity in the oxygen supply side of 65% RH, a humidity un the carrier gas side of 65% RH, an oxygen pressure of 1 atm, and a carrier gas pressure of 1 atm. The carrier gas was nitrogen gas containing hydrogen gas in 2 vol %. The results are evaluated and categorized into the following 2 levels A, and B. Criteria A: 0.5 cc/(m$^2$·day·atm) or more and less than 2 cc/(m$^2$·day·atm)

B: 2 cc/(m$^2$·day·atm) or more.

(4-2) OTR (Oxygen Transmission Rate) after Vapor Deposition

Using a vapor deposition multilayer film obtained in Examples and Comparative Examples, an oxygen transmission rate was measured where the inorganic vapor deposition (D) layer was in the oxygen supply side while the thermoplastic resin (B) layer was in the carrier gas side. Specifically, an oxygen transmission rate (unit: cc/(m$^2$·day·atm)) was measured using an oxygen transmission measurement device ("MOCON OX-TRAN2/21", from Modern Control Co., Ltd.) under the conditions of a temperature of 20° C., a humidity in the oxygen supply side of 65% RH, a humidity un the carrier gas side of 65% RH, an oxygen pressure of 1 atm, and a carrier gas pressure of 1 atm. The carrier gas was nitrogen gas containing hydrogen gas in 2 vol %. The results are evaluated and categorized into the following 3 levels A, B, and C.

Criteria

A: less than 0.1 cc/(m$^2$·day·atm)

B: 0.1 cc/(m$^2$·day·atm) or more and less than 0.5 cc/(m$^2$·day·atm) C: 0.5 cc/(m$^2$·day·atm) or more and less than 2 cc/(m$^2$·day·atm).

Example 1

A resin composition was prepared by kneading 97 mass parts of EVOH (a-1) with an ethylene content of 32 mol %, a saponification degree of 99.9 mol %, and an MFR (at 210° C., under a load of 2.16 kg) of 4.0 g/10 min, and 3 mass parts of EVOH (a-3) with an ethylene content of 44 mol %, a saponification degree of 99.9 mol %, and an MFR (at 210° C., under a load of 2.16 kg) of 12.0 g/10 min using a twin-screw extrude "TEX30α" from Japan Steel Works, Ltd.

<Conditions of an Extruder>

Apparatus: 30 mmΦ twin-screw extruder

L/D: 45.5

Screw: corotational intermeshing type

Extrusion temperature: 220° C.

Rotation speed: 200 rpm

Discharge rate: 20 kg/hr

Using the obtained resin composition and an inflation extrusion molding machine, a cylindrical multilayer film was prepared under the following conditions. In preparation of the multilayer film, die lip deposition was evaluated in accordance with the method described in the above evaluation method (2). The results are shown in Table 1. Here, the thermoplastic resin (B) layer is three 30-μm thick layers, and as a result, one thermoplastic resin (B) layer with a thickness of 90 μm.

<Conditions of Preparation of a Multilayer Film>

Layer configuration of the multilayer film: [Outer surface side] thermoplastic resin (B) layer/adhesive resin (C) layer/resin composition (A) layer [Inner surface side]=90 μm/20 μm/20 μm (total thickness: 130 μm) Thermoplastic resin (B) layer: B-1 (polyethylene resin, Lumicene™ Supertough40ST05)

Adhesive resin (C) layer: C-1 (polyethylene-based adhesive resin, ADMER™ NF528)

Resin composition (A) layer: the resin composition obtained above

Apparatus: 5-type 5-layer inflation extrusion molding machine (Dr. Collin Co.)

Die temperature: 210° C. Blow-up ratio: 2.7. Taking-off speed: 4 m/min. Film folding diameter width: 25 cm <Conditions of a Thermoplastic Resin (B) Layer Extruder 1>

Extruder: 30 Φ single-screw extruder (Dr Collin Co.). Rotation speed: 60 rpm. extrusion temperature: supply zone/compression zone/metering zone=170° C./190° C./210° C.

<Conditions of a Thermoplastic Resin (B) Layer Extruder 2>

Extruder: 20 Φ single-screw extruder (Dr Collin Co.). Rotation speed: 70 rpm. extrusion temperature: supply zone/compression zone/metering zone=170° C./190° C./210° C.

<Conditions of a Thermoplastic Resin (B) Layer Extruder 3>

Extruder: 20 Φ single-screw extruder (Dr Collin Co.). Rotation speed: 70 rpm. extrusion temperature: supply zone/compression zone/metering zone=170° C./190° C./210° C.

<Conditions of an Adhesive Resin (C) Layer Extruder>

Extruder: 20 Φ single-screw extruder (Dr Collin Co.). Rotation speed: 70 rpm. extrusion temperature: supply zone/compression zone/metering zone=170° C./190° C./210° C.

<Conditions of a Resin Composition (A) Layer Extruder>

Extruder: 30 Φ single-screw extruder (Dr Collin Co.). Rotation speed: 24 rpm. extrusion temperature: supply zone/compression zone/metering zone=190° C./210° C./210° C.

The resulting cylindrical multilayer film was folded such that the resin composition (A) layer overlaps, and uniaxially stretched by 6 times in a longitudinal direction (MD direction) at 120° C. using a stretching apparatus (SDR-5 06WK) from ETO Co., Ltd., to give a stretched multilayer film (thermoplastic resin (B) layer/adhesive resin (C) layer/resin composition (A) layer=15 μm/3.3 μm/3.3 μm). The stretched multilayer film was evaluated for blocking and film surface after stretching as described in the above evaluation methods (1) and (3). The results are shown in Table 1.

Both ends of the stretched multilayer film were cut to produce a flat multilayer film. The obtained flat multilayer film was measured for an oxygen transmission rate before deposition as described in the above evaluation method (4). The results are shown in Table 1. Using the obtained flat multilayer film, a vapor deposition multilayer film was produced by vacuum vapor deposition of aluminum in the resin composition (A) layer side to a thickness of 40 nm using "EWA-105" from Nippon Vacuum Technology Co., Ltd.

The vapor deposition multilayer film was measured for an oxygen transmissivity as described in the above evaluation method (4). The results are shown in Table 1.

<Preparation of a Multilayer Structure>

Two types of multilayer structures having the layer configuration as described below were prepared, using the obtained stretched multiple films before and after vapor deposition, and a 30 μm uniaxially stretched PE film (E-1) and a 50 μm LLDPE film (E-2) as a thermoplastic resin (E) layer. One multilayer structure had a layer configuration of thermoplastic resin (B) layer/adhesive resin (C) layer/resin composition (A) layer/LLDPE film. The other multilayer structure had a layer configuration of uniaxially stretched PE film/thermoplastic resin (B) layer/adhesive resin (C) layer/resin composition (A) layer/inorganic vapor deposition (D) layer/LLDPE film. When the uniaxially stretched PE film and the LLDPE film were laminated on the multilayer film and the vapor deposition multilayer film, a two-pack urethane adhesive ("Takelac A-520" and "Takenate A-50", from Mitsui Chemicals, Inc.) was applied to a dry thickness of 2 μm before lamination by dry lamination method.

Examples 2 to 15, and Comparative Examples 1 to 2

Multilayer films, vapor deposition multilayer films and multilayer structures were produced and evaluated as described in Example 1, except that the types and a ratio (a1/a2) of EVOH (a1) and EVOH (a2) were varied as shown in Table 1. The results are shown in Table 1.

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Resin composition (A) layer | EVOH (a1) | Type | a-1 | a-1 | a-1 | a-1 | a-1 | a-1 | a-2 | a-3 | a-1 | a-1 |
| | | Ethylene unit content (mol %) | 32 | 32 | 32 | 32 | 32 | 32 | 27 | 44 | 32 | 32 |
| | | MFR (g/10 min) | 4.0 | 4.0 | 4.0 | 4.0 | 4.0 | 4.0 | 4.0 | 12.0 | 4.0 | 4.0 |
| | EVOH (a2) | Type | a-3 | a-3 | a-3 | a-3 | a-3 | a-3 | a-1 | a-4 | a-7 | a-3 |
| | | Ethylene unit content (mol %) | 44 | 44 | 44 | 44 | 44 | 44 | 32 | 48 | 44 | 44 |
| | | MFR (g/10 min) | 12.0 | 12.0 | 12.0 | 12.0 | 12.0 | 12.0 | 4.0 | 15.0 | 4.0 | 12.0 |
| | | Mass ratio [a1/a2] | 97/3 | 95/5 | 90/10 | 60/40 | 50/50 | 5/95 | 80/20 | 80/20 | 80/20 | 80/20 |

-continued

| | | | | | | | | | | | |
|---|---|---|---|---|---|---|---|---|---|---|---|
| | Difference in ethylene unit content a2-a1 (mol %) | 12 | 12 | 12 | 12 | 12 | 12 | 5 | 4 | 12 | 12 |
| Multilayer film | Thickness of (A) layer after stretching (μm) | 3.3 | 3.3 | 3.3 | 3.3 | 3.3 | 3.3 | 3.3 | 3.3 | 3.3 | 3.3 |
| | Thickness ratio of (A) layer in multilayer film (%) | 15 | 15 | 15 | 15 | 15 | 15 | 15 | 15 | 15 | 15 |
| Evaluation | Blocking | B | A | A | A | A | A | B | B | A | A |
| | Die lip deposition | C | C | B | B | B | B | C | A | C | B |
| | Film surface after stretching | C | B | A | A | A | A | C | A | A | A |
| | OTR | A | A | A | A | B | B | A | B | A | A |
| | OTR after aluminum deposition | C | B | A | A | B | B | C | B | A | A |

| | | | Example 11 | Example 12 | Example 13 | Example 14 | Example 15 | Comparative Example 1 | Comparative Example 2 |
|---|---|---|---|---|---|---|---|---|---|
| Resin composition (A) layer | EVOH (a1) | Type | a-2 | a-1 | a-5 | a-5 | a-6 | a-1 | a-3 |
| | | Ethylene unit content (mol %) | 27 | 32 | 32 | 32 | 35 | 32 | 44 |
| | | MFR (g/10 min) | 4.0 | 4.0 | 9.0 | 9.0 | 19.0 | 4.0 | 12.0 |
| | EVOH (a2) | Type | a-3 | a-4 | a-3 | a-4 | a-3 | | |
| | | Ethylene unit content (mol %) | 44 | 48 | 44 | 48 | 44 | | |
| | | MFR (g/10 min) | 12.0 | 15.0 | 12.0 | 15.0 | 12.0 | | |
| | Mass ratio [a1/a2] | | 80/20 | 80/20 | 80/20 | 80/20 | 80/20 | | |
| | Difference in ethylene unit content a2-a1 (mol %) | | 17 | 16 | 12 | 16 | 9 | | |
| Multilayer film | Thickness of (A) layer after stretching (μm) | | 3.3 | 3.3 | 3.3 | 3.3 | 3.3 | 3.3 | 3.3 |
| | Thickness ratio of (A) layer in multilayer film (%) | | 15 | 15 | 15 | 15 | 15 | 15 | 15 |
| Evaluation | Blocking | | A | A | A | A | A | C | C |
| | Die lip deposition | | B | B | A | A | A | C | A |
| | Film surface after stretching | | B | A | A | A | A | C | A |
| | OTR | | A | A | A | A | B | A | B |
| | OTR after aluminum deposition | | B | A | A | A | B | C | B |

From Example 1 and Comparative Examples 1 and 2, it can be seen that EVOH (A) comprising two types having a different ethylene unit content allows blocking resistance to be improved. Comparing Examples 1 to 6 and 10 indicates that with an EVOH (A) ratio (a1/a2) being less than 97/3, blocking resistance, evaluation results of film surface stability after stretching and die-lip deposition are further improved, and with more than 50/50, gas barrier properties are further improved. Examples 7 and 9 indicate that with an ethylene unit content of the ethylene-vinyl alcohol copolymer (a1) being less than 40 mol % and an ethylene unit content of the ethylene-vinyl alcohol copolymer (a2) being 40 mol % or more, film surface after stretching tends to be improved while oxygen barrier properties of the multilayer film is maintained. Examples 9, 10 and 13 indicate that when a melt flow rate of at least one of the ethylene-vinyl alcohol copolymers is 5 to 30 g/10 min, die lip deposition tends to be reduced. Examples 10, 11 and 15 indicate that with an ethylene unit content of the ethylene-vinyl alcohol copolymer (a1) being more than 27 mol % and less than 35 mol %, the film surface after stretching tends to be improved while oxygen barrier properties of the multilayer film is maintained. and oxygen barrier properties after aluminum vapor deposition also tends to be excellent.

In order to examine recyclability, each multilayer structure obtained in Example 1 was ground into a size of 4 $mm^2$ or less, and single layer deposition was conducted under the extrusion conditions described below, to give a monolayer film with a thickness of 20 μm. No particles or streaks were observed in the obtained monolayer film.

Extrusion Conditions

Extruder: Toyo Seiki Seisaku-sho, Ltd., single screw extruder

Screw diameter: 20 mmΦ (L/D=20, compression ratio=3.5, full flight type)

Extrusion temperature: C1/C2/C3/D=190/230/230/230° C.

Taking-off roll temperature: 80° C.

The invention claimed is:

1. A vapor deposition multilayer film comprising:

a multilayer film comprising:

a resin composition (A) layer containing an ethylene-vinyl alcohol copolymer (a1) with an ethylene unit content of 20 mol % or more and 60 mol % or less and an ethylene-vinyl alcohol copolymer (a2) with an ethylene unit content being more than that of the ethylene-vinyl alcohol copolymer (a1);

a thermoplastic resin (B) layer; and an adhesive resin (C) layer; and an inorganic vapor deposition (D) layer directly in contact with an exposed surface of the resin composition (A) layer, wherein an outermost layer in the multilayer film includes the resin composition (A) layer; and the multilayer film is an inflation molded article and is stretched uniaxially by 3 times or more and 12 times or less;

an average thickness of the inorganic vapor deposition (D) layer is 10 nm or more and 150 nm or less;

a layer structure of the vapor deposition multilayer film is:

(i) layer (B)/layer (C)/layer (A)/layer (D);

(ii) layer (B)/layer (C)/layer (A)/layer (C)/layer (A)/layer (D);

(iii) layer (A)/layer (C)/layer (B)/layer (C)/layer (A)/layer (D); or (iv) layer (B)/layer (C)/layer (A)/layer (C)/layer (B)/layer (C)/layer (A)/layer (D), and the film is stretched in the machine direction (MD) but not in the transverse direction (TD).

2. The vapor deposition multilayer film according to claim 1, wherein a mass ratio [a1/a2] of a content of the ethylene-vinyl alcohol copolymer (a1) to a content of the ethylene-vinyl alcohol copolymer (a2) in the resin composition (A) layer is 2/98 or more and 40/60 or less.

3. The vapor deposition multilayer film according to claim 1, wherein a difference (a2-a1) in an ethylene unit content between the ethylene-vinyl alcohol copolymer (a2) and the ethylene-vinyl alcohol copolymer (a1) in the resin composition (A) layer is 3 mol % or more.

4. The vapor deposition multilayer film according to claim 1, wherein an ethylene unit content of the ethylene-vinyl alcohol copolymer (a1) is less than 40 mol % and an ethylene unit content of the ethylene-vinyl alcohol copolymer (a2) is 40 mol % or more.

5. The vapor deposition multilayer film according to claim 1, wherein at least one of the ethylene-vinyl alcohol copolymer (a1) and the ethylene-vinyl alcohol copolymer (a2) has a melt flow rate of 5 g/10 min or more and 30 g/10 min or less measured at 210° C. under a load of 2160 g in accordance with JIS K 7210:2014.

6. The vapor deposition multilayer film according to claim 1, wherein a thickness of the resin composition (A) layer is 0.5 μm or more and 20 μm or less, and a ratio of a thickness of the resin composition (A) layer to the total thickness of all layers of the vapor deposition multilayer film is 30% or less.

7. The vapor deposition multilayer film according to claim 1, wherein the thermoplastic resin (B) layer contains a polyethylene resin as a main component.

8. A multilayer structure comprising the vapor deposition multilayer film according to claim 1, further comprising a thermoplastic resin (E) layer.

9. The multilayer structure according to claim 8, wherein both thermoplastic resin (B) layer and thermoplastic resin (E) layer contain a polyethylene resin as a main component.

10. A packaging material comprising the multilayer structure according to claim 8.

11. The vapor deposition multilayer film according to claim 1, wherein a saponification degree of vinyl ester units of the ethylene-vinyl alcohol copolymer (a1) and the ethylene-vinyl alcohol copolymer (a2) is 99 mol % or more.

12. The vapor deposition multilayer film according to claim 1, wherein a thickness of the resin composition (A) layer is 0.5 μm or more and 5 μm or less, and a ratio of a thickness of the resin composition (A) layer to the total thickness of all layers of the vapor deposition multilayer film is 5% to 30%.

13. The vapor deposition multilayer film according to claim 1, wherein a mass ratio [a1/a2] of a content of the ethylene-vinyl alcohol copolymer (a1) to a content of the ethylene-vinyl alcohol copolymer (a2) in the resin composition (A) layer is 2/98 or more and 57/43 or less.

14. The vapor deposition multilayer film according to claim 1, wherein the layer structure of the vapor deposition multilayer film is layer (B)/layer (C)/layer (A)/layer (D).

15. The vapor deposition multilayer film according to claim 1, wherein the layer structure of the vapor deposition multilayer film is layer (B)/layer (C)/layer (A)/layer (C)/layer (A)/layer (D).

16. The vapor deposition multilayer film according to claim 1, wherein the layer structure of the vapor deposition multilayer film is layer (A)/layer (C)/layer (B)/layer (C)/layer (A)/layer (D).

17. The vapor deposition multilayer film according to claim 1, wherein the layer structure of the vapor deposition multilayer film is layer (B)/layer (C)/layer (A)/layer (C)/layer (B)/layer (C)/layer (A)/layer (D).

18. The vapor deposition multilayer film according to claim 7, wherein:

the polyethylene resin includes at least one selected from a linear low-density polyethylene, a low-density polyethylene, a medium-density polyethylene, and a high-density polyethylene, the inorganic vapor deposition (D) layer includes at least one selected from a metal, a metal oxide, a metal nitride, a metal nitrided oxide, and a metal carbonitride, and the adhesive resin (C) layer includes a polyolefin having a carboxy group, a polyolefin having a carboxylic anhydride group, or a polyolefin having an epoxy group.

19. The vapor deposition multilayer film according to claim 1, wherein a layer structure of the vapor deposition multilayer film is:

(ii) layer (B)/layer (C)/layer (A)/layer (C)/layer (A)/layer (D); or (iv) layer (B)/layer (C)/layer (A)/layer (C)/layer (B)/layer (C)/layer (A)/layer (D).

* * * * *